(12) United States Patent
Emani et al.

(10) Patent No.: US 12,464,566 B2
(45) Date of Patent: Nov. 4, 2025

(54) REDUCING POWER AND LATENCY IN COEXISTING TRANSMISSIONS PROTOCOLS WITH OVERLAPPING CHANNELS

(71) Applicant: Silicon Laboratories Inc., Austin, TX (US)

(72) Inventors: Krishna Chaitanya Suryavenkata Emani, Hyderabad Telangana (IN); Hari Bhargav Nalla, Andhra Pradesh (IN); Dhaneswar Maharana, Bhadrak Odisha (IN)

(73) Assignee: Silicon Laboratories Inc., Austin, TX (US)

( * ) Notice: Subject to any disclaimer, the term of this patent is extended or adjusted under 35 U.S.C. 154(b) by 428 days.

(21) Appl. No.: 18/302,870

(22) Filed: Apr. 19, 2023

(65) Prior Publication Data

US 2024/0357647 A1    Oct. 24, 2024

(51) Int. Cl.
*H04W 74/0816*    (2024.01)

(52) U.S. Cl.
CPC ............................... *H04W 74/0816* (2013.01)

(58) Field of Classification Search
CPC .................................................. H04W 74/0816
See application file for complete search history.

(56) References Cited

U.S. PATENT DOCUMENTS

| | | | | |
|---|---|---|---|---|
| 5,828,660 | A * | 10/1998 | Baum | H04L 5/023 370/330 |
| 9,560,579 | B2 | 1/2017 | Batta et al. | |
| 10,244,536 | B1 * | 3/2019 | Jiang | H04W 24/08 |
| 2002/0061031 | A1 * | 5/2002 | Sugar | H04W 16/14 370/445 |
| 2011/0116401 | A1 * | 5/2011 | Banerjea | H04W 84/12 370/252 |
| 2018/0176820 | A1 * | 6/2018 | DenBoer | H04W 72/56 |
| 2018/0352055 | A1 * | 12/2018 | He | H04L 1/0084 |
| 2018/0367286 | A1 * | 12/2018 | Guo | H04L 5/0064 |
| 2019/0044779 | A1 * | 2/2019 | Wu | H04W 72/1215 |

(Continued)

FOREIGN PATENT DOCUMENTS

WO    WO-0230022 A2 *  4/2002   .......... H04W 74/085
WO    WO_2017135221    *  8/2017

OTHER PUBLICATIONS

Error Sense: Characterizing Wi Fi Error Patterns for Detecting ZigBee Interference â 2014 (Year: 2014).*

(Continued)

*Primary Examiner* — Nizar N Sivji
(74) *Attorney, Agent, or Firm* — Zagorin Cave LLP (57) ABSTRACT

A traffic arbitration technique enables a wireless personal area network (WPAN) protocol to use channel assessment performed by a wireless personal area network protocol (WLAN) and to transmit associated data immediately following completion of a WLAN transmission without an intervening channel assessment or backoff event. This technique reduces power consumption and latency introduced by backoff events of coexistence techniques of the WPAN protocol and increases intermittent transmission of WPAN data. The WPAN protocol may enter a sleep mode after transmission thereby further reducing power consumption of a system with co-located wireless communications protocols.

20 Claims, 8 Drawing Sheets

(56) References Cited

U.S. PATENT DOCUMENTS

2020/0314920 A1* 10/2020 Seok ................. H04W 74/0808
2024/0107515 A1* 3/2024 Sood ................. H04W 72/1215

OTHER PUBLICATIONS

ETSI TR 103 766 V1.1.1—Intelligent Transport Systems (ITS) (Year: 2021).*
Aruba Blogs, "Understanding 802.11 Medium Contention," Mar. 25, 2015, https://blogs.arubanetworks.com/industries/understanding-802-11-medium-contention/, 10 pages.
Infineon, "AN214801—2-Wire, 3-Wire, and 4-Wire Coexistence," Spec No. 002-14801, Document No. 002-14801 Revision *C, Mar. 11, 2019, downloaded from www.cypress.com, 8 pages.
Ndih, E., and Cherkaoui, S., "Adaptive 802.15.4 Backoff Procedure to Survive Coexistence with 802.11 in Extreme Conditions," 2016 13th IEEE Annual Consumer Communications & Networking Conference (CCNC), Jan. 9-12, 2016, 6 pages.
Silicon Laboratories Inc., "EFR32MG21 Mighty Gecko Multiprotocol Wireless SoC Family Data Sheet," Revision 0.1, May 2018, 76 pages.
Silicon Laboratories Inc., "MGM240S Multi-Protocol Wireless Module Data Sheet," Revision 1.0, Dec. 2022, 64 pages.
Silicon Laboratories Inc., "Wi-Fi Coexistence with Other 2.4 GHz Radio Protocols," v1.0—Wi-Fi AP/documentation Silicon Labs, downloaded from https://docs.silabs.com/wifi/wf200/content-source/application-note/wifi-coexistence on Jan. 31, 2023, 24 pages.
Silicon Laboratories Inc., "RS9116 n-Link™ and WiSeConnect™ Wi-Fi® and Dual-Mode Bluetooth® 5 Wireless Connectivity CC0 Module Solutions," RS9116 CC0 Connectivity Module Datasheet v1.0.12, Dec. 2022, 89 pages.

* cited by examiner

REDUCING POWER AND LATENCY IN COEXISTING TRANSMISSIONS PROTOCOLS WITH OVERLAPPING CHANNELS

BACKGROUND

Field of the Invention

Description of the Related Art

Wireless local area network (WLAN) protocols (e.g., Wi-Fi®) and wireless personal area network (WPAN) protocols (e.g., Zigbee® or Thread®) are being widely deployed across different consumer and electronics devices in home, life, and industrial applications. Both WPAN and WLAN protocols operate in the 2.4 GHz frequency band and both use Carrier Sense Multiple Access-Collision Avoidance (CSMA-CA) for channel access before transmitting the frames over the air. When both WLAN and WPAN protocols are operating in the 2.4 GHz frequency band, their channels may overlap in frequency.

Figure 1:
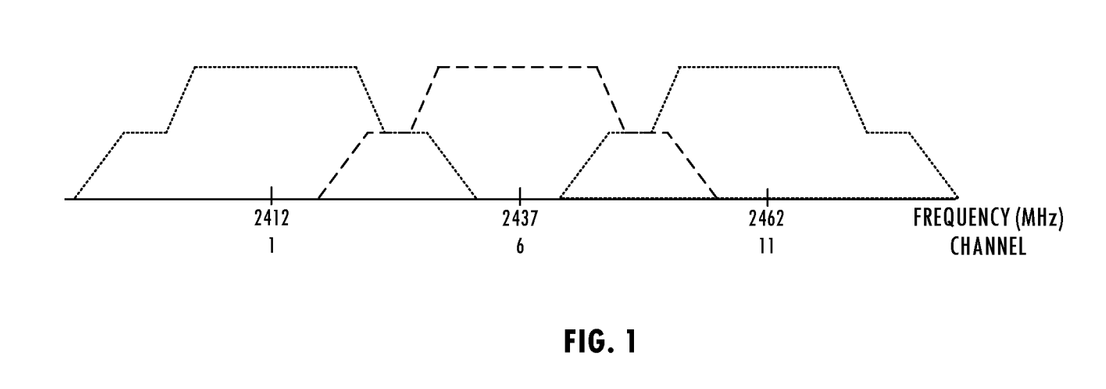
FIG. 1 illustrates the three non-overlapping radio frequency (RF) channels and associated sidebands of a WLAN communications protocol.
Figure 2:
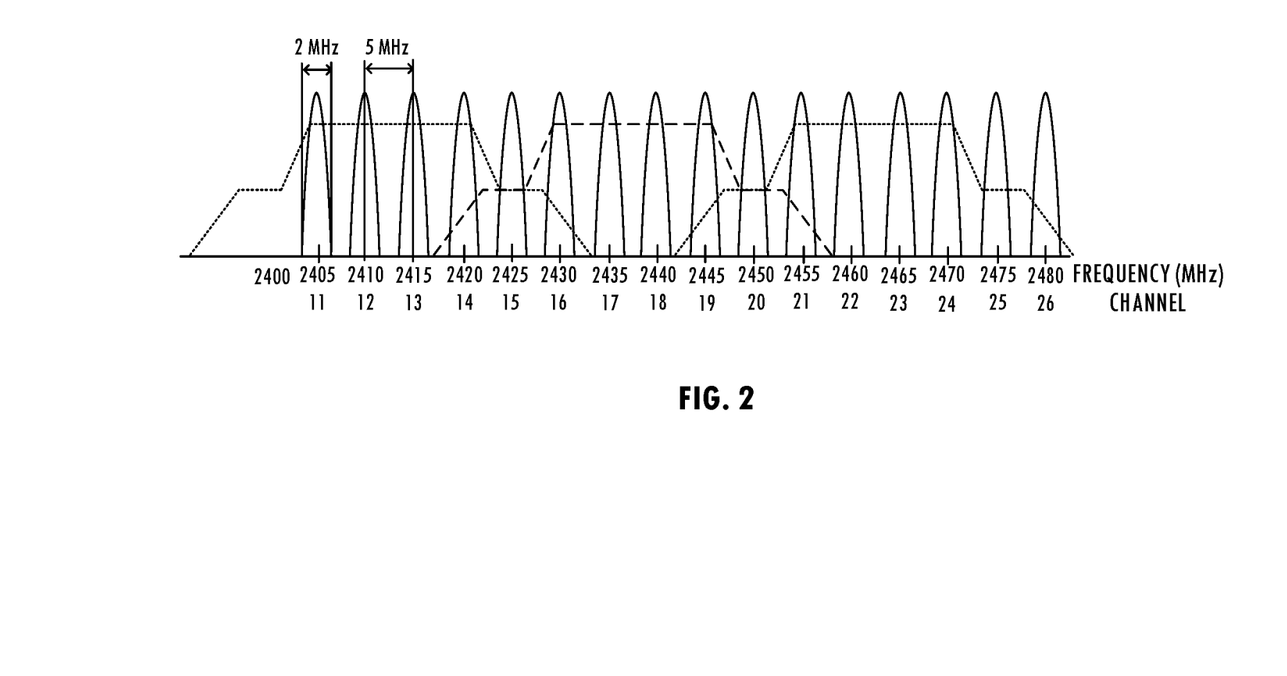
FIG. 2 illustrates RF channels 11 to 26 of the Zigbee communications protocol and the three non-overlapping RF channels and associated sidebands of a WLAN communications protocol.

FIG. 1 illustrates Wi-Fi channels 1, 6, and 11, each with 20 MHz bandwidth and respective center frequencies of 2412 MHz, 2437 MHz, and 2462 MHz. FIG. 2 illustrates Zigbee channels 11 to 26 (2405 MHz to 2480 MHz) with a width of 2 MHz separated by 5 MHz center to center. If WLAN and WPAN radios are co-located and operating in overlapping physical channels (e.g., WLAN on Channel 1 and WPAN on any of the Channels 11-14), whenever a wireless communications device using either the WLAN protocol or the WPAN protocol transmits, each protocol must scan the channel to ensure that the channel is available. If the corresponding channel is not available, then the associated transmitter must trigger a backoff time before the transmitter scans the channel again. If the channel is available, then a first protocol that acquired the transmission medium transmits while the other protocol triggers a backoff time and waits for the first protocol to finish transmission. In a few scenarios, the WPAN protocol might not obtain access to the transmission medium until transmission by the WLAN protocol completes since WLAN protocols typically have more aggressive medium access parameters as compared to WPAN protocols. Such policies starve the WPAN protocol of access to the transmission medium and impact performance of the WPAN protocol in practice. Accordingly, improved coexistence techniques for radio protocols that have overlapping physical channels are desired.

SUMMARY OF EMBODIMENTS OF THE INVENTION

In at least one embodiment, a method for operating coexisting transmissions protocols with overlapping physical channels includes, in response to a combined traffic arbitrator detecting a first physical channel associated with a first communications protocol overlapping a second physical channel associated with a second communications protocol and detecting the first physical channel as available, transmitting, using the first physical channel, first data associated with the first communications protocol and after transmitting the first data, transmitting, using the second physical channel, second data associated with the second communications protocol. The second data may be transmitted immediately after transmission of the first data completes without detecting the second physical channel as available or triggering any backoff event for the second data.

In at least one embodiment, a multi-protocol wireless communications system includes a first link layer corresponding to a first communications protocol and configured to indicate, to a combined traffic arbitrator, first data for transmission using a first physical channel associated with the first communications protocol. The multi-protocol wireless communications system includes a second link layer corresponding to a second communications protocol and configured to indicate, to the combined traffic arbitrator, second data for transmission using a second physical channel associated with the second communications protocol. The multi-protocol wireless communications system includes the combined traffic arbitrator configured to initiate transmission of the first data by the first communications protocol using the first physical channel and the second data using the second physical channel in response to detecting the first physical channel overlapping the second physical channel and the first communications protocol detecting the first physical channel as available, the second data being transmitted after transmitting the first data. The second data may be transmitted by the second communications protocol immediately after transmission of the first data completes without detecting the second physical channel as available or triggering any backoff event for the second data.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

A traffic arbitration technique enables a WPAN protocol (e.g., IEEE 802.15.4 based protocol Zigbee® or Thread®) to use channel assessment performed by a WLAN protocol (e.g., Wi-Fi) to transmit associated data immediately following completion of a WLAN transmission without an intervening channel assessment or backoff event. This technique reduces power consumption and latency introduced by backoff events of coexistence techniques of the WPAN protocol and increases intermittent transmission of WPAN data. The WPAN protocol may enter a sleep mode after transmission thereby further reducing power consumption of a system with co-located wireless communications protocols.

Figure 3:
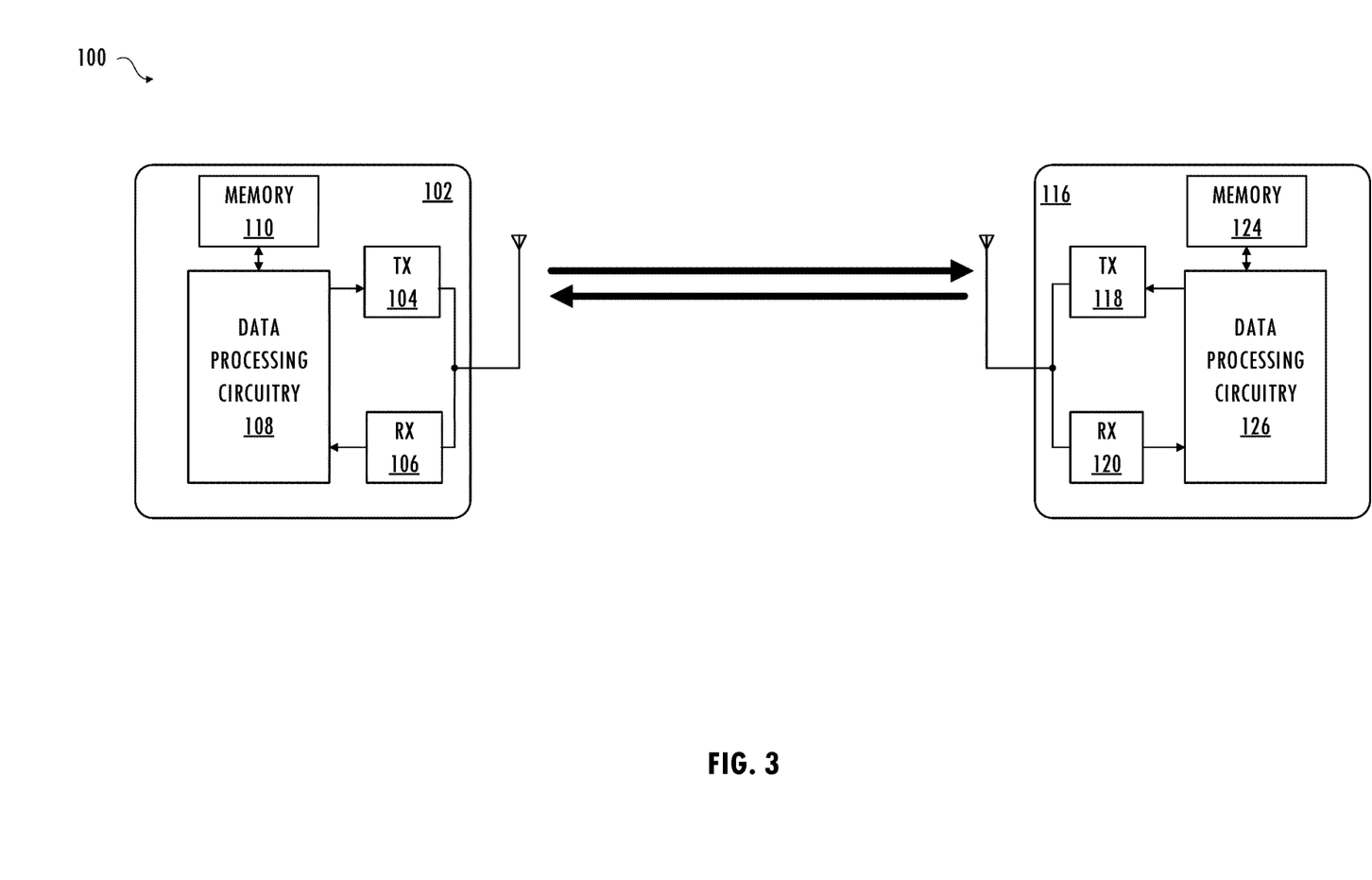
FIG. 3 illustrates a functional block diagram of an exemplary wireless communications system implementing multiple communications protocols with overlapping physical channels.

Referring to FIG. 3, in at least one embodiment, wireless communications system 100 includes wireless communications device 102, having transmitter 104, receiver 106, data processing circuitry 108, and memory 110, and wireless communications device 116, which includes transmitter 118, receiver 120, data processing circuitry 126, and memory 124. Although wireless communications device 102 and wireless communications device 116 are illustrated as each including only one transmitter, receiver, and antenna, in other embodiments of wireless communications system 100, wireless communications device 102 or wireless communications device 116 include multiple transmitters, receivers, and antennas. Wireless communications system 100 can communicate data modulated using multiple wireless communications protocols having overlapping physical channels, e.g., data modulated using a WPAN protocol (e.g., IEEE 802.15.4 based protocols) and data modulated using a WLAN protocol (e.g., an IEEE 802.11 b/g/n protocol). Note that for the purposes of the system described herein the term Zigbee will be used for ease of reference to describe IEEE 802.15.4 based protocols including Zigbee and Thread. Zigbee defines higher-level layers and interoperability sublayers for IEEE 802.15.4 specification low-rate wireless personal area networks with low-power radios. However, in other embodiments, wireless communications system 100 is capable of transmitting and receiving data compliant with other wireless communications protocols.

Figure 4:
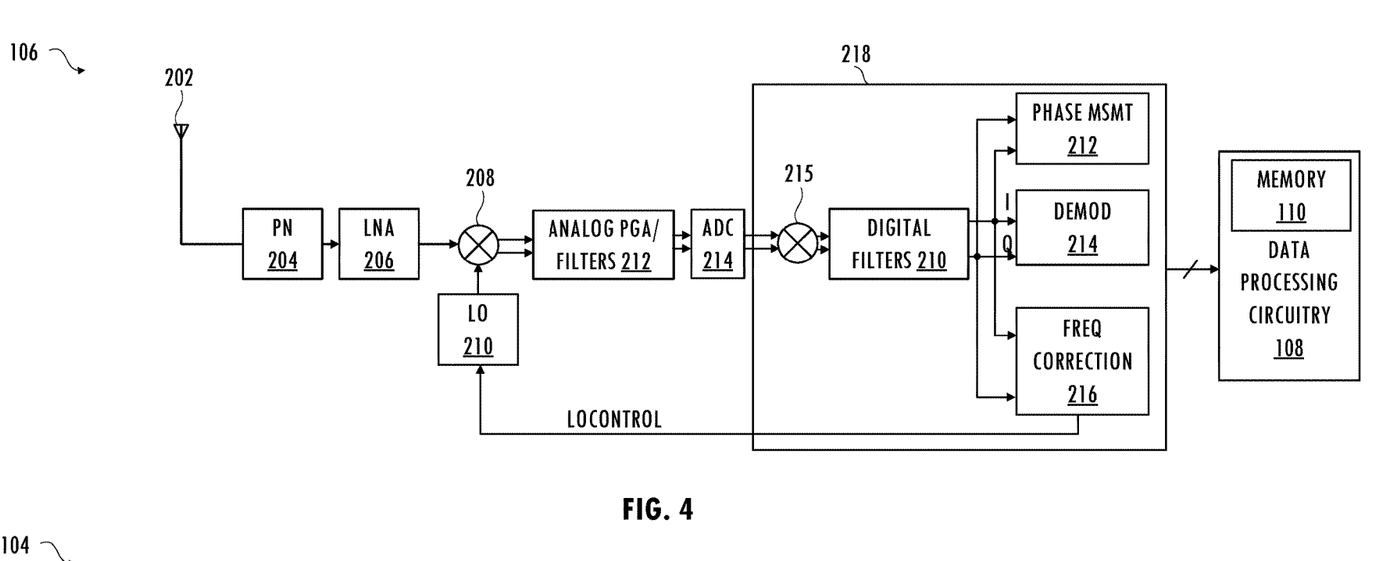
FIG. 4 illustrates a functional block diagram of an exemplary wireless communications receiver of FIG. 3.

FIG. 4 illustrates an exemplary embodiment of receiver 106 that may be included in physical radio of the wireless communications devices described above. Antenna 202 provides an RF signal to passive network 204, which provides impedance matching, filtering, and electrostatic discharge protection. Passive network 204 is coupled to low-noise amplifier (LNA) 206, which amplifies the RF signal without substantial degradation to the signal-to-noise ratio and provides the amplified RF signal to frequency mixer 208. Frequency mixer 208 performs frequency translation or shifting of the RF signal using a reference or local oscillator (LO) signal provided by local oscillator 210. For example, in at least one operational mode of receiver 106, frequency mixer 208 translates the RF signal from a 2.4 GHz frequency band to baseband frequencies centered at DC (i.e., zero-intermediate frequency (ZIF) in a ZIF mode of operation). In another operational mode, receiver 106 is configured as a low-intermediate frequency (LIF) receiver (i.e., in a LIF mode of operation) and frequency mixer 208 translates the RF signal to a low-intermediate frequency (e.g., 100-200 kHz) to avoid DC offset and 1/f noise problems of ZIF receivers.

Frequency mixer 208 provides the translated output signal as a set of two signals, an in-phase (I) signal, and a quadrature (Q) signal. The I and Q signals are analog time-domain signals. In at least one embodiment of receiver 106, the analog amplifiers and filters 212 provide amplified and filtered versions of the I and Q signals to analog-to-digital converter (ADC) 214, which converts those versions of the I and Q signals to digital I and Q signals (i.e., I and Q samples). Exemplary embodiments of ADC 214 use a variety of signal conversion techniques (e.g., delta-sigma (i.e., sigma-delta) analog to digital conversion). ADC 214 provides the digital I and Q signals to signal processing circuitry 218. In general, signal processing circuitry 218 performs processing (e.g., demodulation, frequency translation (e.g., using mixer 215), filtering (e.g., digital filters 210), or signal correction) of the digital I and Q signals. In at least one embodiment, signal processing circuitry 218 includes demodulator 214, which retrieves or extracts information from digital I and Q signals (e.g., data signals, that were modulated by a transmitter (not shown) and provided to antenna 202 as RF signals). In at least one embodiment, one or more circuits of signal processing circuitry 108 converts digital I and Q signals from a Cartesian representation into polar representation (i.e., instantaneous phase and instantaneous amplitude) for use by frequency correction circuit 216 or phase measurement circuit 212.

Data processing circuitry 108 may perform a variety of functions (e.g., logic, arithmetic, etc.). For example, data processing circuitry 108 may use the demodulated data in a program, routine, or algorithm (whether in software, firmware, hardware, or a combination thereof) to perform desired control or data processing tasks. In at least one embodiment, data processing circuitry 108, which includes memory 110, controls other circuitry, sub-system, or systems (not shown). In an embodiment, data processing circuitry 108 implements a data link layer that includes a state machine, defines state transitions, defines packet formats, performs scheduling, performs radio control, and provides link-layer decryption consistent with at least one wireless communications protocol.

Figure 5:
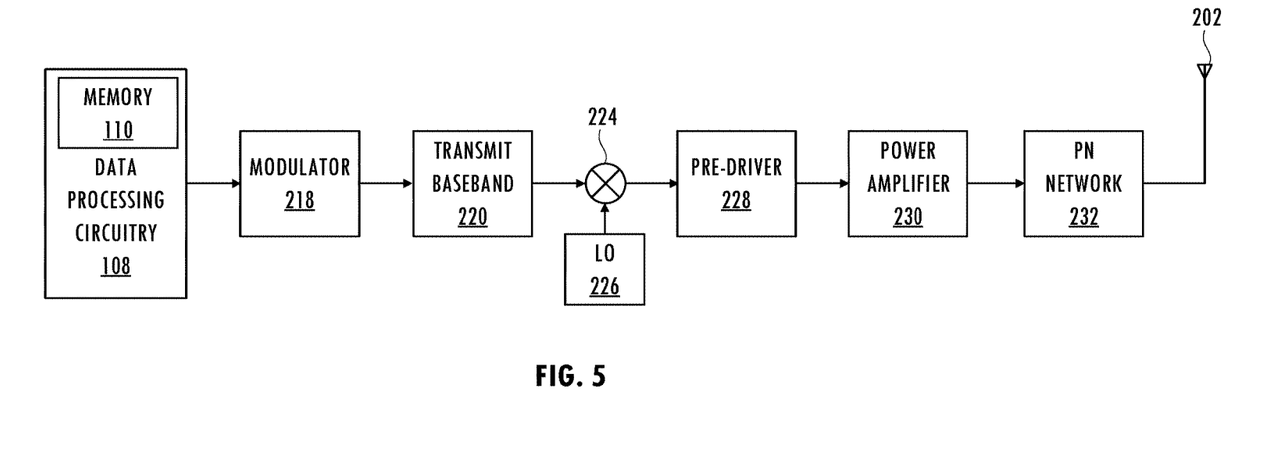
FIG. 5 illustrates a functional block diagram of an exemplary wireless communications transmitter of FIG. 3.

FIG. 5 illustrates an exemplary embodiment of transmitter 104 that may be included in a physical radio of wireless communications device 102 or wireless communications device 116 of FIG. 3. Data processing circuitry 108 of FIG. 5 may perform a variety of functions (e.g., logic, arithmetic, etc.). For example, data processing circuitry 108 executes a program, routine, or algorithm (whether in software, firmware, hardware, or a combination thereof) that performs desired control or data processing tasks consistent with a physical layer of a communications protocol and provides data to modulator 218. Modulator 218 provides the modulated data to transmit baseband circuit 220, which in an embodiment includes a digital-to-analog converter and analog programmable gain filters. Transmit baseband circuit 220 provides the baseband (or intermediate frequency (IF)) signal to frequency mixer 224, which performs frequency translation or shifting of the baseband signal using a reference or local oscillator (LO) signal provided by local oscillator 226. In at least one operational mode of transmitter 104, frequency mixer 224 translates the baseband signal centered at DC to a 2.4 GHz frequency band. Pre-driver 228 amplifies the signal generated by frequency mixer 224 to a level sufficient for power amplifier 230. Power amplifier 230 further amplifies the signal to provide a higher power signal sufficient to drive passive network 232 and antenna 202. Passive network 232 provides impedance matching, filtering, and electrostatic discharge protection.

Figure 6:
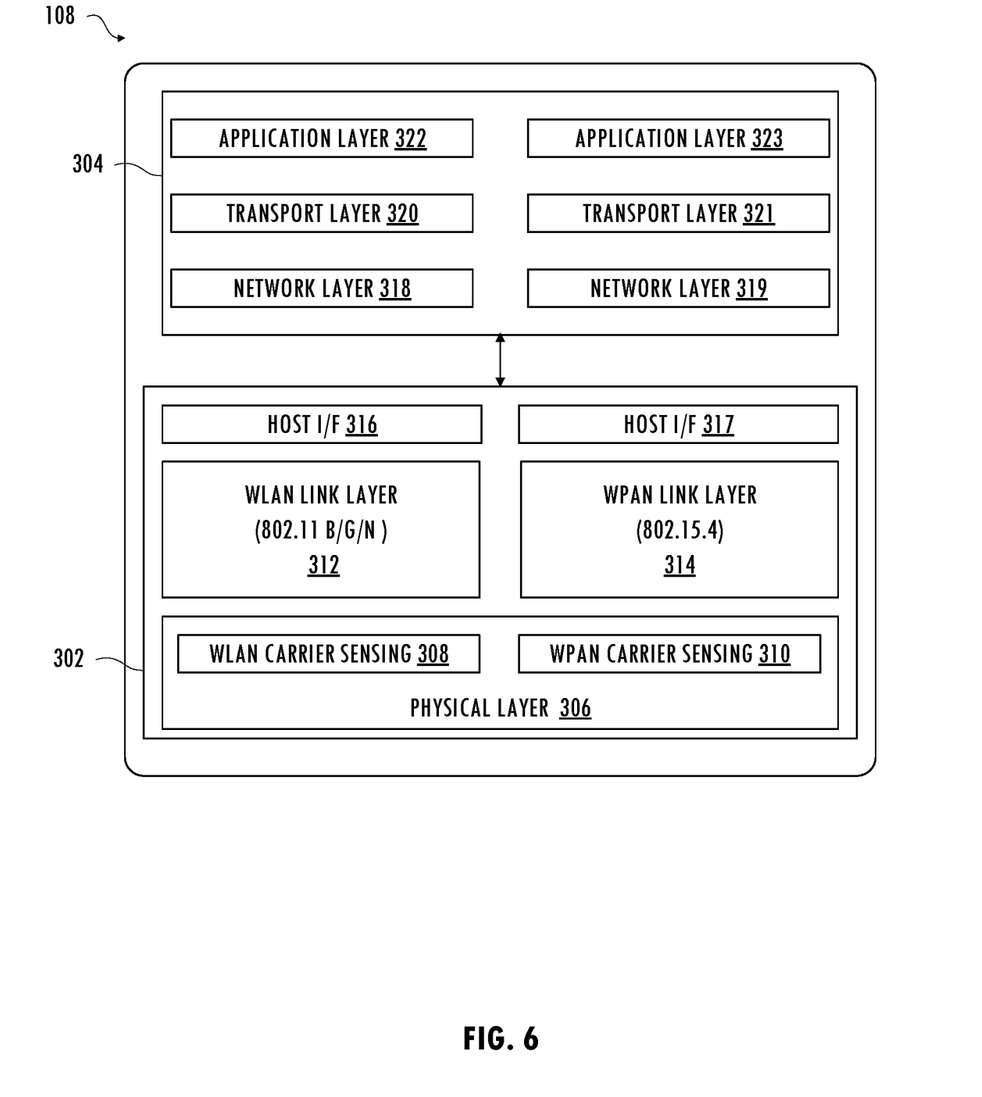
FIG. 6 illustrates a functional block diagram of the protocol stack executing on an exemplary wireless communications device of FIG. 2.

Referring to FIGS. 3 and 6, in an embodiment, data processing circuit 108 includes separate integrated circuits for controller 302 and host 304. In some embodiments, wireless communications device 102 incorporates functionality of controller 302 and host 304 in a single integrated circuit device. Controller 302 executes instructions to implement portions of the WPAN and WLAN protocol stacks. For example, controller 302 implements physical layer 306 which is software that interacts with the RF transceiver (e.g., the transmitter and receiver described above). WLAN carrier sensing layer 308 implements coexistence strategies that manage the Wi-Fi protocol to operate simultaneously with another 2.4 GHz protocol using at least some of the same radio frequency resources. WPAN carrier sensing layer 310 implements coexistence strategies that manage the Zigbee protocol to operate simultaneously with another 2.4 GHz protocol using at least some of the same radio frequency resources. WPAN link layer 314 and WLAN link layer 312 interface directly to physical layer 306 to handle transmission and reception of associated signals. In at least one embodiment, WPAN link layer 314 and WLAN link layer 312 of controller 302 communicate with host 304 via host interface 316 and host interface 317, respectively. Host 304 implements upper layers of the communications protocol stacks (e.g., network layer 318, network layer 319, transport layer 320, transport layer 321, application layer 322, and application layer 323, which implements the upper layers for the WPAN and WLAN protocol stacks). In other embodiments, the layers of the software protocol stacks have different distributions between controller 302 and host 304 or are completely implemented using controller 302.

Figure 7:
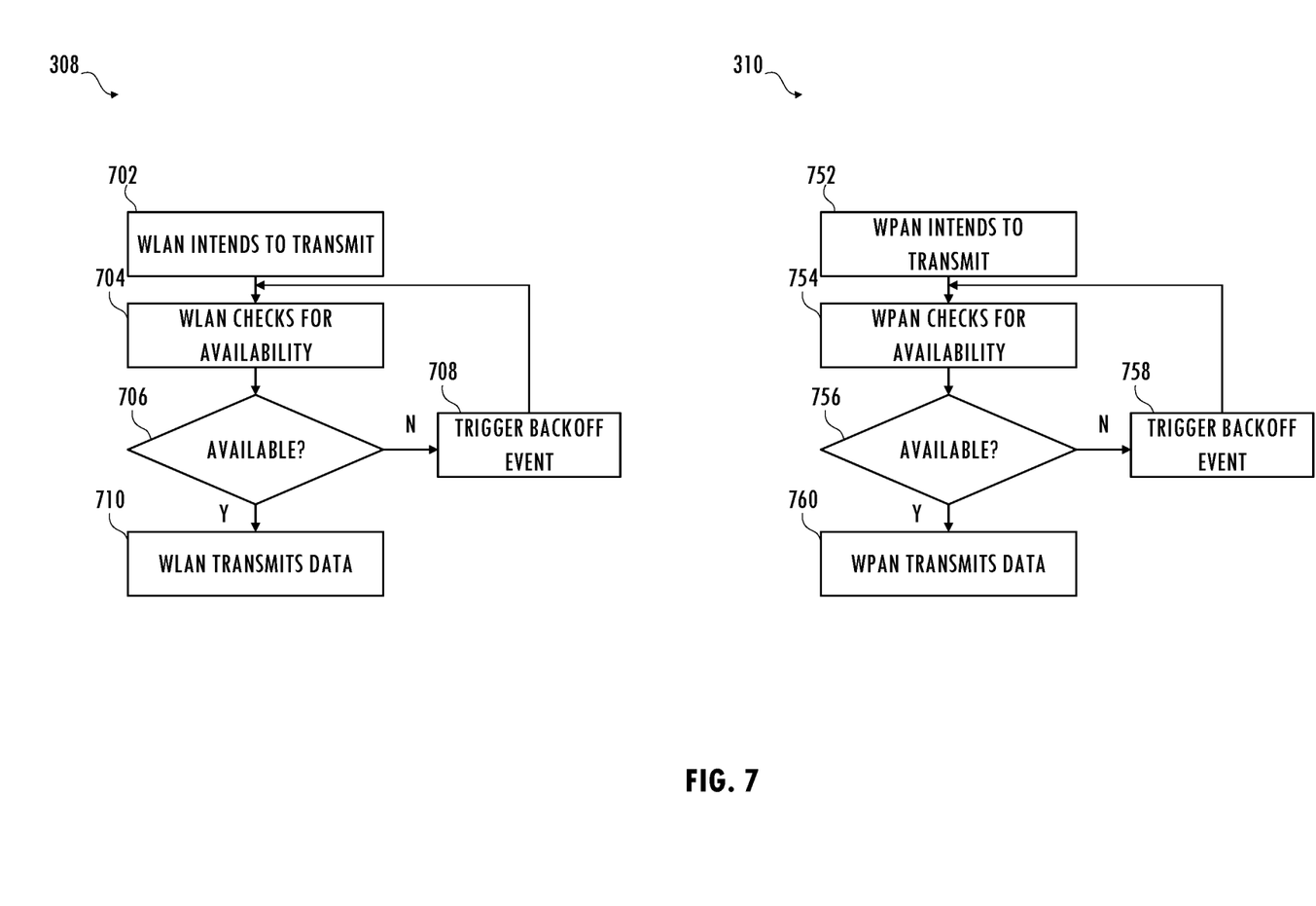
FIG. 7 illustrates information and control flows for data transmission in a conventional wireless communications system implementing multiple communications protocols.

Referring to FIGS. 6 and 7, in an embodiment of a wireless communications system, the WLAN protocol and the WPAN protocol are co-located and share at least some resources (e.g., a host 304, controller 302, and physical layer 306). However, controller 302 implements at least separate link layers, e.g., WPAN link layer 314 and WLAN data link layer 312. Each communications protocol also executes a separate carrier sensing layer as a separate software layer or as part of a corresponding link layer. In at least one embodiment, WLAN carrier sensing layer 308 and WPAN carrier sensing layer 310 execute independently on controller 302 to check the corresponding physical channel for availability for communications and initiating transmission of data (e.g., by forwarding a packet of data to the RF transceiver for transmission over the corresponding physical channel if the corresponding physical channel is available for communications). For example, WLAN carrier sensing layer 308 receives an indication that WLAN link layer 312 intends to transmit a packet using a corresponding physical channel (702). WLAN carrier sensing layer 308 determines whether the physical channel is available for a transmission (704), e.g., by performing carrier sensing or energy detection over a duration of a predetermined number (e.g., eight) of symbols. If detected energy or a Received Signal Strength Indicator (RSSI) for the physical channel is above a predetermined level (e.g., a sensed energy level is above a predetermined energy threshold value for predetermined number of receiver intervals), then the corresponding physical channel is considered unavailable. If the corresponding physical channel is unavailable for a transmission (706), then WLAN carrier sensing layer 308 triggers a backoff event before redetermining availability of the physical channel (708).

In an exemplary backoff procedure for a WLAN protocol, the wireless communications device sets a backoff counter to a backoff time uniformly chosen between 0 and a predetermined maximum value referred to as a contention window. At any backoff state, if the physical channel is determined to be unavailable, then WLAN carrier sensing layer 308 freezes the backoff counter until the physical channel is determined to be available, e.g., idle for a predetermined time, and then WLAN carrier sensing layer 308 decrements the backoff counter. When the backoff counter reaches zero, WLAN carrier sensing layer 308 triggers transmission of WLAN data (e.g., adds a packet header, which may include an indicator of a time for transmission, and pushes a data packet to the physical interface). In response to successfully receiving the packet, a receiver transmits an acknowledgement to the wireless communications device after sensing the channel as being idle for a predetermined period. In at least one embodiment, if the wireless communications device does not receive the acknowledgement, then WLAN carrier sensing layer 308 doubles the contention window up to a maximum value. If the contention window exceeds the predetermined maximum value, then WLAN carrier sensing layer 308 assumes the packet is dropped. The described WLAN backoff procedure is exemplary only and other backoff procedures may be used.

If the physical channel is available for a transmission (e.g., the energy level detected in the physical channel is below a predetermined energy threshold value) (706), then WLAN carrier sensing layer 308 triggers transmission of the data using the WLAN protocol (710). Meanwhile, WPAN carrier sensing layer 310 executes concurrently with WLAN carrier sensing layer 308. WPAN carrier sensing layer 310 receives an indication that WPAN link layer 314 intends to transmit data using a physical channel (752). WPAN carrier sensing layer 310 determines whether the physical channel is available for a transmission (754), e.g., by performing an energy detection or preamble detection operation using a predetermined number of receiver intervals. If the physical channel is unavailable for a transmission (e.g., the energy level detected in the physical channel is above a predetermined energy threshold value for a predetermined number of receiver intervals) (756), then WPAN carrier sensing layer 310 triggers a backoff event (758).

In an exemplary WPAN backoff procedure, the WPAN protocol waits for a random number of backoff periods between 0 and $2^{BE}-1$, where BE is a backoff exponent that is greater than or equal to three and less than or equal to 5. At the end of the backoff period, WPAN carrier sensing layer 310 performs a clear channel assessment over a predetermined number of symbols (e.g., eight symbols). If the physical channel is determined to be unavailable during this period, WPAN carrier sensing layer 310 increments the backoff exponent and the number of backoffs, up to corresponding maximum values. If the backoff exponent reaches the corresponding maximum value, it remains at this value until the packet is successfully transmitted or dropped. If the number of backoffs exceeds a corresponding maximum number, or if the number of retransmissions exceeds a maximum number of retries, then WPAN carrier sensing layer 310 causes the packet to be dropped. For a given packet, WPAN carrier sensing layer 310 increments the number of retries by one each time the node fails to receive an acknowledgement after transmitting the packet. The described WPAN backoff technique is exemplary only and other backoff techniques may be used.

If the physical channel is available for a transmission (e.g., the energy level detected in the physical channel is below a predetermined energy threshold value for eight receiver intervals) (756), then WPAN carrier sensing layer 310 triggers transmission of data using the WPAN protocol (760). In the embodiments illustrated in FIGS. 6 and 7, WLAN carrier sensing layer 308 and WPAN carrier sensing layer 310 each scan the transmission medium for availability of a corresponding physical channel (e.g., both carrier sensing layers perform energy detection in a corresponding physical channel). Any random backoff events incurred by WLAN carrier sensing layer 308 or WPAN carrier sensing layer 310 introduce latency in the communications.

Figure 8:
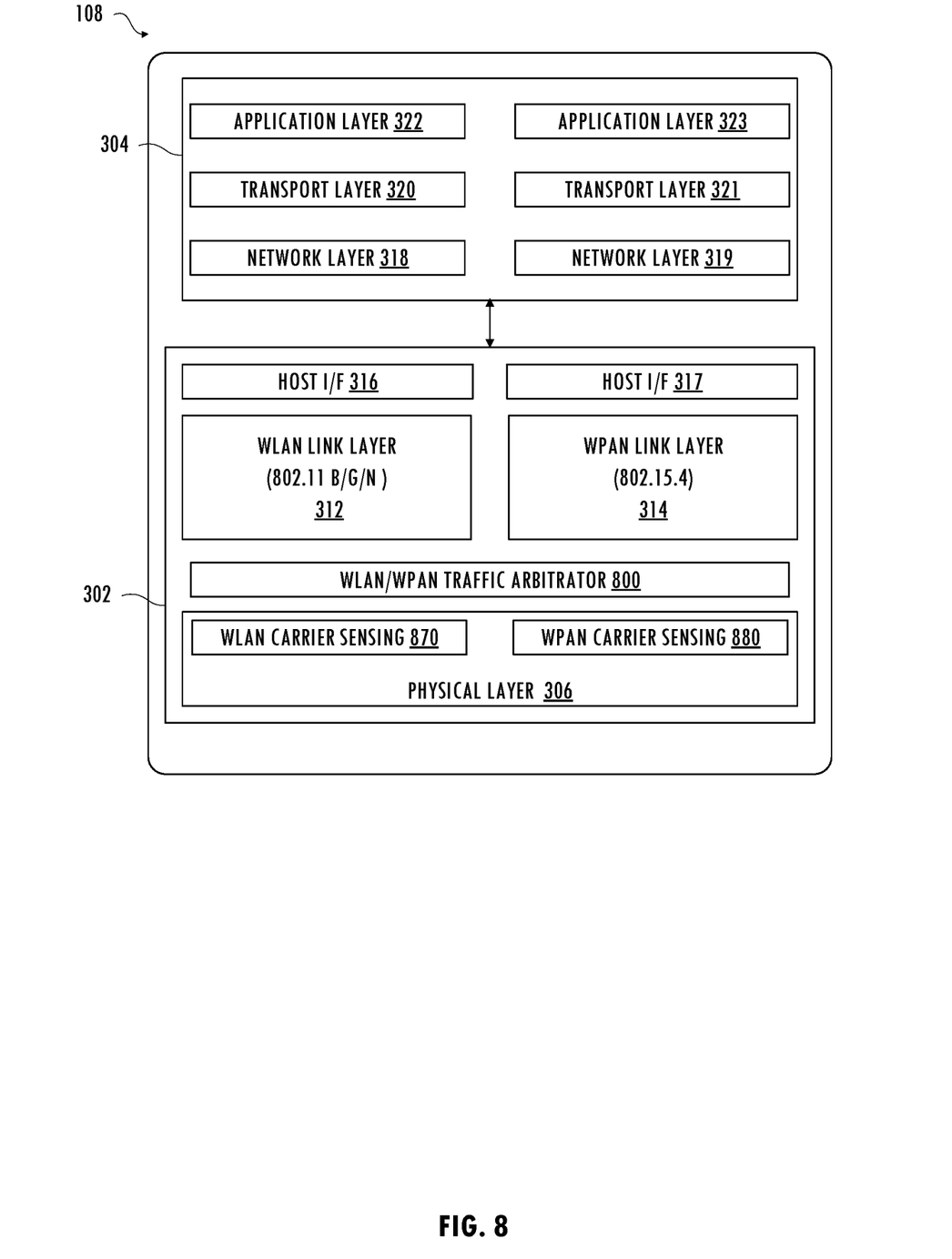
FIG. 8 illustrates a functional block diagram of the protocol stack executing on a wireless communications system including a traffic arbitrator consistent with at least one embodiment of the invention.
Figure 9:
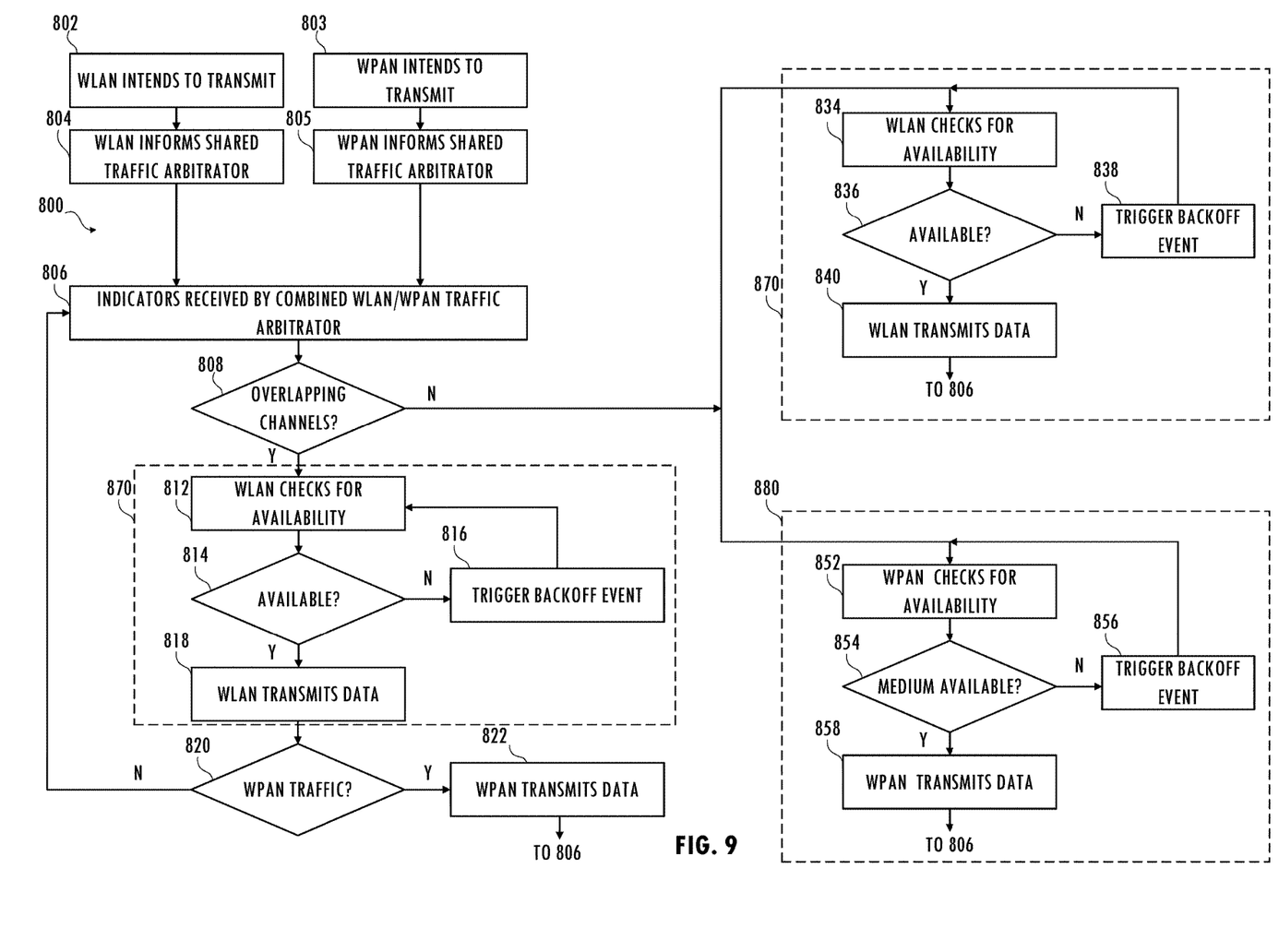
FIG. 9 illustrates information and control flows for an exemplary traffic arbitrator of FIG. 8 consistent with at least one embodiment of the invention.

Referring to FIGS. 8 and 9, a coexistence technique reduces power consumption and transmission latency in a communications system including multiple coexisting and co-located protocols (e.g., communications protocols that share at least memory buffers in a system-on-chip) that use overlapping physical channels of a transmissions medium. In at least one embodiment, WLAN protocol is an IEEE 802.11 b/g/n protocol and the WPAN protocol is a Zigbee protocol, the physical channel of the WLAN protocol uses a wider channel (e.g., 20 MHz) than the physical channels used by the WPAN protocol (e.g., 2 MHz) and can include four of WPAN physical channels. Thus, the WLAN protocol channel scan also determines availability of the WPAN physical channel on any of the overlapping physical channels. In at least one embodiment, WLAN/WPAN traffic arbitrator 800 executes in a controller shared by a WPAN protocol and a WLAN protocol, e.g., a controller executing WLAN data link layer 312 and WPAN link layer 314. In at least one embodiment, WLAN/WPAN traffic arbitrator 800 takes advantage of a channel availability determination performed by the WLAN protocol and triggers the WPAN transmission using its corresponding physical channel (i.e., the physical channel that overlaps the physical channel of the WLAN transmission) immediately after completion of the WLAN data transmission. Accordingly, WLAN/WPAN traffic arbitrator 800 reduces or eliminates any additional channel availability determination and any additional backoff period for overlapping physical channels used by the WPAN protocol, thereby reducing power consumption and latency, and improving data throughput of at least the WPAN protocol.

If the WLAN protocol stack intends to transmit data (802), WLAN data link layer 312 provides a corresponding indication to combined WLAN/WPAN traffic arbitrator 800 (804). If the WPAN protocol stack intends to transmit data (803), then WPAN link layer 314 provides a corresponding indication to combined WLAN/WPAN traffic arbitrator 800 (805). Combined WLAN/WPAN traffic arbitrator 800 receives an indication from WLAN data link layer 312 that the WLAN protocol stack intends to transmit and concurrently receives an indication from WPAN link layer 314 that the WPAN protocol stack intends to transmit (806). Combined WLAN/WPAN traffic arbitrator 800 determines whether the WPAN data and the WLAN data are assigned to overlapping physical channels for transmission (808). If combined WLAN/WPAN traffic arbitrator 800 detects that the packets for transmission by the WPAN protocol stack are assigned to physical channels that do not overlap the physical channel for the WLAN data for transmission (808), then WLAN carrier sensing 870 and WPAN carrier sensing 880 proceed with transmission of the WLAN data and the WPAN data, respectively, using conventional techniques.

For example, WLAN carrier sensing 870 determines whether the corresponding physical channel for transmission is available for the WLAN transmission (834), e.g., by performing an energy detection or preamble detection operation using a predetermined number of receiver intervals. If the physical channel is unavailable for a transmission (e.g., the energy level detected in the physical channel is above a predetermined energy threshold value for a predetermined number of receiver intervals) (836), then WLAN carrier sensing 870 triggers a backoff event (838), as described above. If the physical channel is available for a transmission (e.g., the energy level detected in the physical channel is below a predetermined energy threshold value for a predetermined number of receiver intervals) (836), then WLAN carrier sensing 870 triggers transmission of the data using the WLAN protocol (840).

Meanwhile, WPAN carrier sensing 880 determines whether the corresponding physical channel is available for the WPAN data transmission (852), e.g., by performing an energy detection or preamble detection operation using a predetermined number of receiver intervals. If the corresponding physical channel is unavailable for WPAN data transmission (e.g., the energy level detected in the physical channel is above a predetermined energy threshold value for a predetermined number of receiver intervals) (854), then WPAN carrier sensing 880 triggers a backoff event (856), as described above. If the corresponding physical channel is available for the WPAN data transmission (e.g., the energy level detected in the physical channel is below a predetermined energy threshold value for a predetermined number of receiver intervals) (854), then WPAN carrier sensing 880 triggers transmission of the data using the WPAN protocol (858).

If combined WLAN/WPAN traffic arbitrator 800 detects that the packets for transmission using the WPAN protocol and the packets for transmission using WLAN protocol are to use overlapping physical channels (808), then combined WLAN/WPAN traffic arbitrator 800 initiates a WLAN determination of whether the corresponding physical channel for the WLAN data is available for the WLAN transmission (812), e.g., by causing WLAN carrier sensing 870 to perform an energy detection or preamble detection operation using a predetermined number of receiver intervals. If the corresponding physical channel is unavailable for transmission of the WLAN data (e.g., the energy level detected in the physical channel is above a predetermined energy threshold value for a predetermined number of receiver intervals) (814), then WLAN carrier sensing 870 triggers a backoff event (816). In at least one embodiment, the WPAN link layer enters a sleep mode at this time. If the WLAN physical channel is available for a transmission (e.g., the energy level detected in the physical channel is below a predetermined energy threshold value) (814), then WLAN carrier sensing 870 triggers transmission of the WLAN data using the WLAN protocol and WLAN/WPAN traffic arbitrator 800 receives an indication of the completion of transmission of the WLAN data (818). Next, WLAN/WPAN traffic arbitrator 800 determines whether any WPAN traffic awaits transmission (820). If so, WLAN/WPAN traffic arbitrator 800 triggers transmission of the WPAN data using the corresponding physical channel which overlapped the physical channel used by the just completed WLAN data transmission (822). The WPAN takes advantage of the channel assessment performed by the WLAN and no additional check for medium availability is performed, thereby avoiding any additional latency or additional backoff event. After transmitting the WPAN packet, WLAN/WPAN traffic arbitrator 800 waits until it receives another indication of the data for transmission using the WLAN protocol or WPAN protocol (806).

Co-location of embodiments of a WPAN protocol stack and a WLAN protocol stack in the same integrated circuit improves resource usage and facilitates transmission of WPAN data immediately following transmission of WLAN data within a predetermined period defined for the WLAN protocol. In at least one embodiment, WLAN link layer 312 or WLAN/WPAN traffic arbitrator 800 aggregates the WLAN and WPAN transmission durations into an overall transmission duration and requests the Network Allocation Vector (NAV) to inform other WLAN clients in the vicinity of the aggregated transmission duration. In at least one embodiment, a predetermined duration threshold is defined to limit the duration of the Physical Layer Protocol Data Unit (PPDU) (i.e., the frame duration for the WLAN data transmission and WPAN data transmission). In an embodiment, logic enables this feature only when the WLAN and WPAN transmission fit within the predetermined duration threshold.

Figure 10:
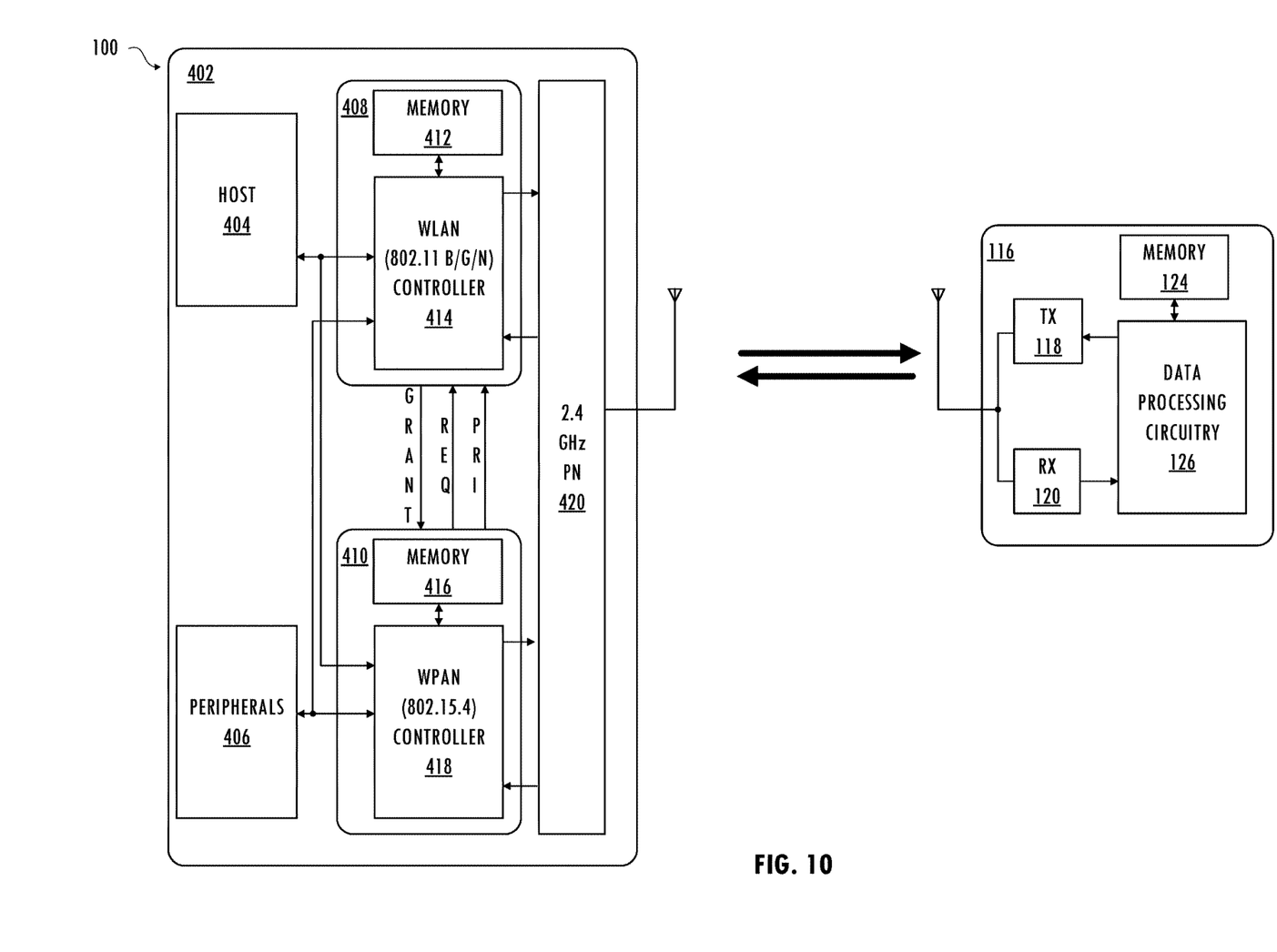
FIG. 10 illustrates a functional block diagram of an exemplary wireless communications system implementing a traffic arbitrator for a wireless personal area network communications and wireless local area network communications using separate integrated circuit devices consistent with at least one embodiment of the invention.

Referring to FIG. 10, in at least one embodiment, rather than implement the WPAN protocol stack co-located with the WLAN protocol stack in the same controller or integrated circuit device, wireless communications device 402 uses two separate integrated circuit controllers. Integrated circuit device 408, which implements at least lower layers of the WLAN protocol stack, communicates with integrated circuit device 410, which implements at least lower layers of the WPAN protocol stack, using general purpose I/O (GPIO) pins. For example, in at least one embodiment, the lower layers of the WPAN communications protocol stack, which may include at least some of the physical interface, are implemented using a separate integrated circuit device from the integrated circuit device that implements the lower layers of the WLAN communications protocol. Integrated circuit device 408, which includes WLAN (802.11 b/g/n) controller 414 and memory 412, is co-located with integrated circuit device 410, which includes WPAN (802.15.4) controller 418 and memory 416. Those integrated circuit devices are each coupled to a 2.4 GHz passive network 420, which in an embodiment, includes a balun and switches coupled to an antenna. Integrated circuit device 408 and integrated circuit device 410 are coupled to host 404 and peripherals 406. A WLAN/WPAN packet traffic arbitrator described above uses the GPIO pins to coordinate access to the overlapping physical channels by integrated circuit device 408 and integrated circuit device 410 for transmissions using the corresponding communications protocols.

In at least one embodiment, in three-wire packet traffic arbitration is used. Integrated circuit device 410 requests an overlapping portion of the 2.4 GHz frequency band using REQ pin. If integrated circuit device 408 is not also trying to access the 2.4 GHz frequency band, no conflict exists, and a packet traffic arbitrator of integrated circuit device 408 grants integrated circuit device 410 access to the 2.4 GHz frequency band using the GRANT pin. A packet traffic arbitrator of integrated circuit device 408 controls the prioritization between integrated circuit device 408 and integrated circuit device 410. In an embodiment, in response to a conflict, integrated circuit device 408 determines whether to grant integrated circuit device 408 or integrated circuit device 410 access to the 2.4 GHz frequency band as described above and further based on a high or low prioritization indicated by integrated circuit device 410 on the PRI pin. Although FIG. 4 illustrates implementation of a 3-wire mode using three GPIO pins, other modes (e.g., a 1-wire, 2-wire, or 4-wire mode) or combination thereof, and other numbers (e.g., 1, 2, or 4, respectively) of GPIO pins may be used.

In at least one embodiment, integrated circuit device 408 includes at least a portion of the WLAN/WPAN traffic arbitrator 800 described above and integrated circuit device 410 informs integrated circuit device 408 of intentions to transmit WPAN packets and integrated circuit device 408 communicates corresponding grants to integrated circuit device 410 that cause integrated circuit device 410 to transmit WPAN packets. For example, integrated circuit device 410 uses GPIO to indicate to integrated circuit device 408 the intention to transmit a WPAN packet and information that identifies the physical channel for the communication. WLAN/WPAN traffic arbitrator 800 executing on integrated circuit device 408 determines whether the physical channel for the WPAN data transmission overlaps a physical channel of a WLAN data transmission. If WLAN/WPAN traffic arbitrator 800 detects non-overlapping physical channels, then WLAN/WPAN traffic arbitrator 800 immediately asserts a grant indicator provided by a GPIO to integrated circuit device 410 and WPAN controller 418 applies conventional transmission and backoff techniques described above.

If WLAN/WPAN traffic arbitrator 800 detects overlapping physical channels then WLAN carrier sensing 870 executing on integrated circuit device 408 determines whether the physical channel is available for the WLAN transmission, e.g., by performing an energy detection or preamble detection operation using a predetermined number of receiver intervals. If the physical channel is unavailable for a WLAN transmission (e.g., the energy level detected in the physical channel is above a predetermined energy threshold value for a predetermined number of receiver intervals), then WLAN carrier sensing 870 triggers a backoff event, as described above. If the transmission medium is available for a transmission (e.g., the energy level detected in the physical channel is below the predetermined energy threshold value for a predetermined number of receiver intervals), then WLAN carrier sensing 870 triggers transmission of the packet using the WLAN protocol. Next, WLAN/WPAN traffic arbitrator 800 determines whether the integrated circuit device 408 received an indication that the WPAN protocol intends to transmit a packet. If so, WLAN/WPAN traffic arbitrator 800 asserts the GRANT pin to grant integrated circuit device 410 access to the physical channel, without an additional check for physical channel availability and without any additional backoff event. After transmission of the WLAN packet and granting integrated circuit device 410 any access to the overlapping physical channels of the transmission medium, WLAN/WPAN traffic arbitrator 800 waits until it receives another indicator of intent to transmit data.

Thus, techniques for reducing power consumption and reducing latency in arbitration of traffic for transmission over overlapping physical channels by coexisting communications protocols have been described. The techniques may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a magnetic, optical, or electronic storage medium.

The description of the invention set forth herein is illustrative and is not intended to limit the scope of the invention as set forth in the following claims. For example, while the invention has been described in an embodiment in which a WLAN (IEEE 802.11 b/g/n) communications protocol and a WPAN (e.g., IEEE 802.15.4) communications protocol share physical resources, use overlapping physical channels in the 2.4 GHz frequency band, and use specific backoff mechanisms, one of skill in the art will appreciate that the teachings herein can be utilized with other wireless communications protocols that share physical resources, use different overlapping physical channels in other frequency bands, and use different backoff mechanisms. The terms "first," "second," "third," and so forth, as used in the claims, unless otherwise clear by context, is to distinguish between different items in the claims and does not otherwise indicate or imply any order in time, location, or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for operating coexisting transmissions protocols with overlapping physical channels comprising:
   in response to a combined traffic arbitrator detecting a first physical channel associated with a first communications protocol overlapping a second physical channel associated with a second communications protocol and detecting the first physical channel as available:
      transmitting, using the first physical channel, first data associated with the first communications protocol; and
      after transmitting the first data, transmitting, using the second physical channel, second data associated with the second communications protocol.

2. The method as recited in claim 1 wherein the second data is transmitted immediately after transmission of the first data completes without detecting the second physical channel as available or triggering any backoff event for the second data.

3. The method as recited in claim 1 further comprising:
   determining by the combined traffic arbitrator whether the first physical channel overlaps the second physical channel and whether the first physical channel is available prior to transmitting the first data.

4. The method as recited in claim 1 wherein the first physical channel has a wider bandwidth than the second physical channel and includes at least the second physical channel.

5. The method as recited in claim 1 further comprising:
   in response to the first physical channel overlapping the second physical channel and the first communication protocol sensing that the first physical channel is not available, triggering a first backoff event for the first data.

6. The method as recited in claim 1 further comprising:
   in response to the first physical channel not overlapping the second physical channel, sensing whether the first physical channel is available and sensing whether the second physical channel is available; and
   transmitting the first data using the first physical channel if the first physical channel is available and triggering a first backoff event for the first data otherwise; and
   transmitting second data using the second physical channel if the second physical channel is available and triggering a second backoff event for the second data otherwise.

7. The method as recited in claim 1 further comprising:
   indicating to the combined traffic arbitrator, the first data for transmission using the first communications protocol; and
   indicating to the combined traffic arbitrator, the second data for transmission using the second communications protocol.

8. The method as recited in claim 1 wherein the first communications protocol is implemented in a first integrated circuit device and the second communications protocol is implemented on a second integrated circuit device and the combined traffic arbitrator is included in the first integrated circuit device and communicates with the second integrated circuit device via general purpose input/output terminals of the first and second integrated circuit devices.

9. The method as recited in claim 1 wherein the first communications protocol is a wide-local area network communications protocol operating in 2.4 GHz frequency band and the second communications protocol is a personal area network communications protocol operating in the 2.4 GHz frequency band.

10. A multi-protocol wireless communications system comprising:
    a first link layer corresponding to a first communications protocol and configured to indicate, to a combined traffic arbitrator, first data for transmission using a first physical channel associated with the first communications protocol;
    a second link layer corresponding to a second communications protocol and configured to indicate, to the combined traffic arbitrator, second data for transmission using a second physical channel associated with the second communications protocol; and
    the combined traffic arbitrator configured to initiate transmission of the first data by the first communications protocol using the first physical channel and the second data using the second physical channel in response to detecting the first physical channel overlapping the second physical channel and the first communications protocol detecting the first physical channel as available, the second data being transmitted by the second communications protocol after transmitting the first data.

11. The multi-protocol wireless communications system as recited in claim 10 wherein the second data is transmitted immediately after transmission of the first data completes without detecting the second physical channel as available or triggering any backoff event for the second data.

12. The multi-protocol wireless communications system as recited in claim 10 wherein the combined traffic arbitrator is further configured to determine whether the first physical channel overlaps the second physical channel and to initiate a determination by the first communications protocol of whether the first physical channel is available prior to transmitting the first data.

13. The multi-protocol wireless communications system as recited in claim 10 wherein the first physical channel has a wider bandwidth than the second physical channel and includes at least the second physical channel.

14. The multi-protocol wireless communications system as recited in claim 10 wherein the first communications protocol is configured to trigger a first backoff event for the first data in response to the first physical channel overlapping the second physical channel and detecting that the first physical channel is not available.

15. The multi-protocol wireless communications system as recited in claim 10 wherein the first communications protocol and the second communications protocol are implemented on a single integrated circuit device.

16. The multi-protocol wireless communications system as recited in claim 10 wherein the first communications protocol is implemented in a first integrated circuit device and the second communications protocol is implemented on a second integrated circuit device and the combined traffic arbitrator is included in the first integrated circuit device and is electrically coupled to the second integrated circuit device via general purpose input/output terminals of the first and second integrated circuit devices.

17. The multi-protocol wireless communications system as recited in claim 16,
wherein the first integrated circuit device comprises:
a memory; and
a processor configured to execute instructions stored in the memory, wherein the instructions stored in the memory are executable by the processor to cause the processor to provide a first indication of the first data for transmission, and
wherein the second integrated circuit device comprises:
a second memory; and
a second processor configured to execute second instructions stored in the memory, wherein the second instructions are executable by the second processor to cause the second processor to provide a second indication of the second data for transmission.

18. The multi-protocol wireless communications system as recited in claim 10 wherein the first communications protocol is a wide-local area network communications protocol operating in 2.4 GHz frequency band and the second communications protocol is a personal area network communications protocol operating in the 2.4 GHz frequency band.

19. The multi-protocol wireless communications system as recited in claim 10 wherein the first link layer and the second link layer are implemented in a first integrated circuit comprising:
a memory; and
a processor configured to execute instructions stored in the memory,
wherein the instructions are executable by the processor to cause the processor to provide the first data and the second data for transmission.

20. An apparatus comprising:
first means for indicating first data associated with a first communications protocol is awaiting transmission; and
means for transmitting second data using a second physical channel after transmitting the first data, in response to a first physical channel associated with the first communications protocol overlapping the second physical channel associated with a second communications protocol and detecting the first physical channel as available,
wherein the first physical channel has a wider bandwidth than the second physical channel and includes at least the second physical channel.

\* \* \* \* \*